(12) United States Patent
Liao et al.

(10) Patent No.: US 7,608,185 B2
(45) Date of Patent: Oct. 27, 2009

(54) HOLLOW FIBER MEMBRANE MODULES FOR USE IN DISTILLATION SYSTEMS

(75) Inventors: Xiaohong Liao, South Windsor, CT (US); Zidu Ma, Ellington, CT (US); James R. Irish, Vernon, CT (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 12/002,669

(22) Filed: Dec. 18, 2007

(65) Prior Publication Data

US 2009/0152184 A1    Jun. 18, 2009

(51) Int. Cl.
*B01D 63/00* (2006.01)
*B01D 15/00* (2006.01)
*B01D 35/18* (2006.01)
*B01D 3/00* (2006.01)

(52) U.S. Cl. .............. 210/321.8; 210/321.78; 210/321.79; 210/321.81; 210/640; 210/180; 210/261; 210/175; 96/4; 96/8; 96/10; 202/180; 202/175; 202/81; 202/202

(58) Field of Classification Search ..................
210/321.78–321.81, 321.87–321.9, 640, 210/180, 175, 500.23, 261; 95/50, 52; 96/4, 96/8, 10; 202/180, 175, 81, 202; 203/10, 203/39
See application file for complete search history.

(56) References Cited

U.S. PATENT DOCUMENTS

| | | | |
|---|---|---|---|
| 3,228,876 A | 1/1966 | Mahon | |
| 4,444,662 A | 4/1984 | Conover | |
| 4,657,743 A * | 4/1987 | Kanno | ............ 422/46 |
| 4,746,437 A | 5/1988 | Koseki et al. | |
| 4,752,305 A | 6/1988 | Johnson | |
| 4,781,834 A | 11/1988 | Sekino et al. | |
| 4,791,054 A * | 12/1988 | Hamada et al. | ............... 435/2 |

(Continued)

FOREIGN PATENT DOCUMENTS

EP    0264696 A2    4/1988

(Continued)

OTHER PUBLICATIONS

Islam, AM., Membrane Distillation Process for Pure Water and Removal of Arsenic, Master of Science thesis for International Master's Program in Applied Environmental Measurement Techniques, Chalmers University of Technology (Gothenburg, Sweden). (publicly available prior to Jul. 12, 2007).

(Continued)

*Primary Examiner*—Ana M Fortuna
(74) *Attorney, Agent, or Firm*—Kinney & Lange, P.A.

(57) ABSTRACT

A membrane module comprising an outer casing having an interior region, a seal disposed within the outer case, thereby dividing the interior region into a first chamber and a second chamber, and a plurality of hollow fiber membranes extending through the first chamber and the second chamber, where at least a portion of the plurality of hollow fiber membranes have first segments located within the first chamber and second segments located within the second chamber, the first segments being configured to allow vapor transmission therethrough, and the second segments being configured to substantially prevent vapor transmission therethrough, and further configured to allow transmission of thermal energy therethrough.

20 Claims, 3 Drawing Sheets

U.S. PATENT DOCUMENTS

| | | | | |
|---|---|---|---|---|
| 4,929,259 | A | * | 5/1990 | Caskey et al. .......... 210/321.89 |
| 5,158,581 | A | | 10/1992 | Coplan |
| 5,176,725 | A | | 1/1993 | Puri et al. |
| 5,192,499 | A | * | 3/1993 | Sakai et al. .................... 422/46 |
| 5,282,964 | A | | 2/1994 | Young et al. |
| 5,300,197 | A | * | 4/1994 | Mitani et al. ................. 202/177 |
| 5,352,361 | A | | 10/1994 | Prasad et al. |
| 6,103,118 | A | | 8/2000 | Ter Meulen |
| 6,156,096 | A | | 12/2000 | Sirkar |
| 6,183,639 | B1 | | 2/2001 | de Winter |
| 6,383,341 | B1 | | 5/2002 | Lysen |
| 6,645,381 | B2 | | 11/2003 | McEvoy |
| 6,716,355 | B1 | * | 4/2004 | Hanemaaijer et al. ....... 210/640 |
| 6,918,886 | B1 | | 7/2005 | Baurmeister |
| 2004/0211726 | A1 | | 10/2004 | Baig et al. |
| 2005/0029192 | A1 | | 2/2005 | Arnold et al. |
| 2005/0184006 | A1 | | 8/2005 | Ma et al. |
| 2006/0076294 | A1 | | 4/2006 | Sirkar et al. |
| 2007/0107884 | A1 | | 5/2007 | Sirkar et al. |

FOREIGN PATENT DOCUMENTS

| | | | |
|---|---|---|---|
| EP | 0442445 | B1 | 9/1995 |
| EP | 0684870 | B1 | 5/1997 |
| WO | 7900069 | A1 | 2/1979 |
| WO | 9915463 | A1 | 4/1999 |

OTHER PUBLICATIONS

Liu, C., et al., Applying Membrane Distillation in High-Purity Water Production for Semiconductor Industry, Department of Energy Technology, Royal Institute of Technology (Stockholm, Sweden). (publicly available prior to Jul. 12, 2007).

El-Bourawi, M.S., et al., A Framework for Better Understanding Membrane Distillation Separation Process, Journal of Membrane Science, 285(2006) 4-29, Aug. 8, 2006.

Sivakumar, S.; et al., Optimizing Membrane Distillation Using Hollow Fibres, Sustainable Earth Research Centre, Environmental Engineering, University of Wollongong (Wollongong, Australia). (publicly available prior to Jul. 12, 2007).

Drioli, E; et al., Microporous Membranes in Membrane Distillation, Pure & Appl. Chem., vol. 58, No. 12, pp. 1657-1662, 1986 IUPAC.

Meindersma, GW, et al., Desalination and Water Recycling by Air Gap Membrane Distillation, Desalination 187 (2006) 291-301.

Koschikowski, J., et al., Solar Thermal-Driven Desalination Plants Based on Membrane Distillation, Desalination 156 (2003) 295-304.

Guijt, CM, et al., Air Gap Membrane Distillation 1. Modeling and Mass Transport Properties for Hollow Fibre Membranes, Separation and Purification Technology 43 (2005) 233-244.

Guijt, CM, et al., Air Gap Membrane Distillation 2. Model Validation and Hollow Fibre Module Performance Analysis, Separation and Purification Technology 43 (2005) 245-255.

Lawson K., et al., Membrane Distillation, Journal of Membrane Science, 124 (1997) 1-25, Aug. 5, 1996.

Chernyshov, M., et al., Modeling Temperature and Salt Concentration Distribution in Membrane Distillation Feed Channel, Desalination 157 (2003) 315-324.

Official Search Report of the European Patent Office in counterpart foreign Application No. 08254056.8 filed Dec. 18, 2008.

Schneider, Holz, Wollbeck, and Ripperger. "Membranes and Modules for Transmembrane Distillation." Journal of Membrane Science, 39 (1988) pp. 25-42.

* cited by examiner

Fig. 1

Fig. 2

HOLLOW FIBER MEMBRANE MODULES FOR USE IN DISTILLATION SYSTEMS

BACKGROUND

The present invention relates to distillation systems for liquid treatment processes. In particular, the present invention relates to distillation systems containing hollow fiber membrane modules for separating distillate fluids from feed solutions in liquid treatment processes.

In recent years, membrane distillation has become increasingly popular in a variety of fluid-treatment applications. The membranes are typically hydrophobic and microporous to keep the feed solution separated from that of the distillate during operation. Hollow fiber membranes are typically employed in tube/shell configurations, where bundles of hollow fiber membranes are arranged along the longitudinal axes of the modules. For membrane distillation, each hollow fiber membrane in the bundle is typically a hydrophobic, microporous membrane having an exterior surface and an inner hollow tubular region. The exterior surfaces of the hollow fiber membranes face a shell side of the module, which is the portion of the module containing the feed solution. The inner hollow tubular regions define a tube side of the module, which provides a conduit for collecting the distillate fluids separated from the feed solution.

During operation, the feed solution is typically heated to form a temperature differential across the wall of the hollow fiber membranes. This temperature differential creates a vapor pressure differential between the tube side and the shell side of the module, which causes vapor transport through the hollow fiber membranes. The transmitted vapor then condenses within the hollow fiber membranes, thereby providing the desired distillate fluid.

During steady state operations, the mass transfer across the hollow fiber membranes can provide good product rates of distillate fluids for a variety of distillation systems. However, a common issue with hollow fiber membrane modules involves the thermal efficiencies of the modules. As the distillate fluid evaporates and transmits through the hollow fiber membranes, latent heat accompanies the transmitted vapor, passing from the shell side to the tube side of the module. Furthermore, the temperature differential between the shell side and the tube side of the module can result in conductive heat transfers across the wall of the hollow fiber membranes. Overall, a large amount of heat is transported through the membrane. If the heat is not recuperated, a high operating cost in terms of thermal energy would result. Thus there is an ongoing need for increased thermal efficiencies in distillation systems containing hollow fiber membrane modules.

SUMMARY

The present invention relates to a hollow fiber membrane module and a distillation system incorporating the hollow fiber membrane module. The hollow fiber membrane module includes an outer casing having an interior region divided into a first chamber and a second chamber, and a plurality of hollow fiber membranes extending through the first and second chambers. At least a portion of the hollow fiber membranes have first segments located within the first chamber and second segments located within the second chamber, where the first segments allow vapor transmission therethrough, and the second segments allow transmission of thermal energy therethrough, but substantially prevent vapor transmission therethrough.

DETAILED DESCRIPTION

Figure 1:
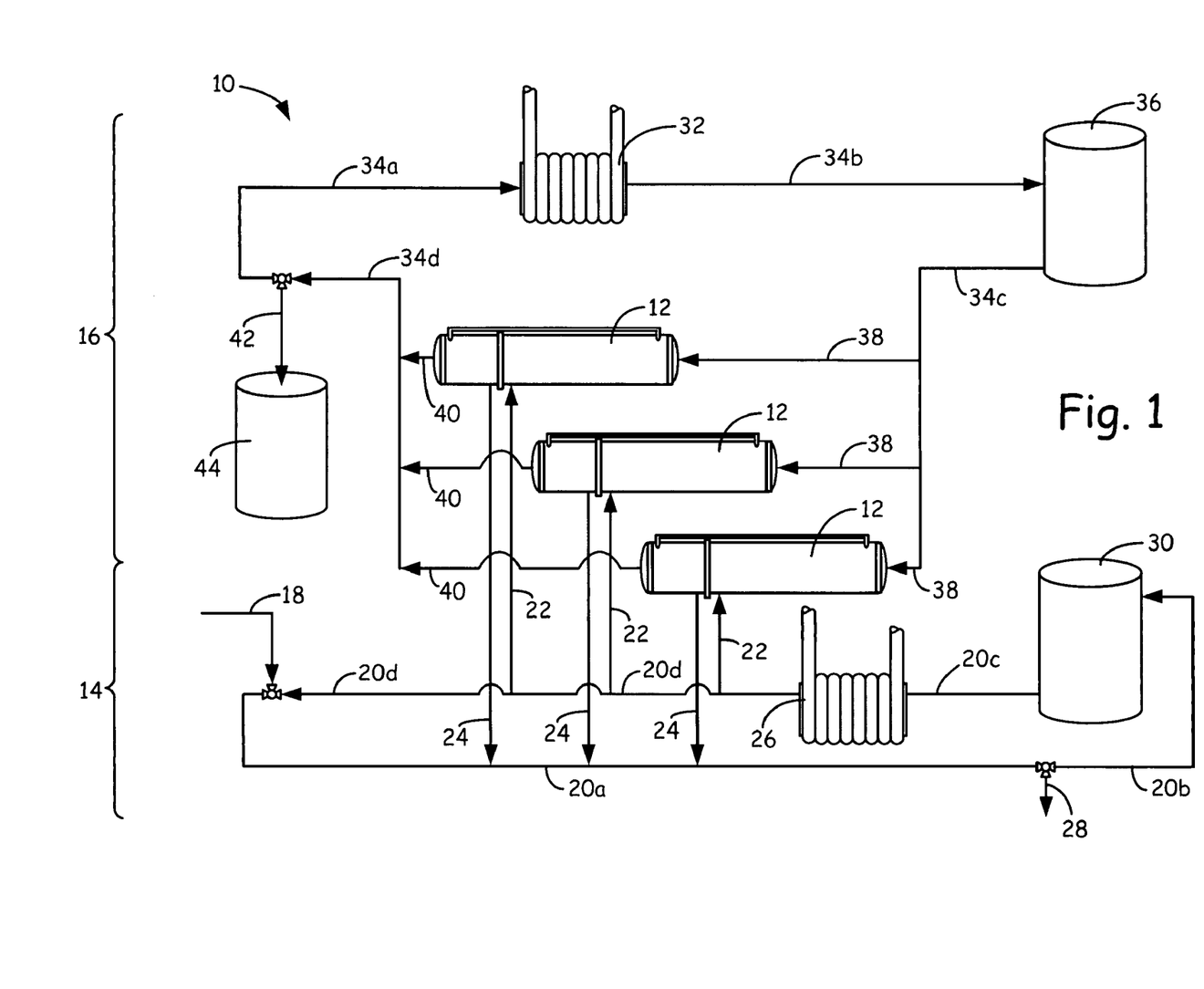
FIG. 1 is a schematic illustration of a distillation system that includes multiple hollow fiber membrane modules.

FIG. 1 is a schematic illustration of distillation system 10, which includes membrane modules 12, feed loop 14, and distillate loop 16, and is a suitable system for separating a desired distillate fluid from a feed solution. Examples of suitable feed solutions for use with distillation system 10 include solutions containing compounds that are separable by vapor pressure differentials across hydrophobic, microporous membranes, such as seawater, brackish water, and other aqueous brine solutions for water and wastewater treatment processes. As used herein, the term "solution" refers to a carrier liquid that contains one or more solids that are fully dissolved, partially dissolved, dispersed, emulsified, or otherwise suspended in the carrier liquid(s). For example, the feed solution may be an aqueous brine solution containing salt that is at least partially dissolved in a water carrier. In this example, distillation system 10 may be used to separate at least a portion of the water from the aqueous brine solution to provide the clean water as the distillate fluid. Distillation system 10 also desirably includes standard fluid processing equipment (not shown), such as process control units, fluid pumps, and filters.

Membrane modules 12 are hollow fiber membrane modules that separate the distillate fluid from the feed solution (e.g., water from an aqueous brine solution). Examples of particularly suitable modules for membrane modules 12 include direct contact membrane distillation (DCMD) modules. As discussed below, membrane modules 12 are each divided into a shell side (not shown in FIG. 1) and a tube side (not shown in FIG. 1), where the shell side is in fluid communication with feed loop 14, and the tube side is in fluid communication with distillate loop 16. During operation, the feed solution travels from feed loop 14 to the shell sides of membrane modules 12. While the feed solution flows through the shell sides of membrane modules 12, the feed solution is separated into the desired distillate fluid and a residual feed solution. The desired distillate fluid transfers to the tube sides of membrane modules 12, and enters distillate loop 16. The residual feed solution remains on the shell sides of membrane modules 12 and reenters feed loop 14.

While distillation system 10 is shown with three membrane modules 12 operating in a parallel arrangement, distillation system 10 may alternatively include additional or fewer numbers of membrane modules 12. Examples of suitable numbers of membrane modules 12 for use in distillation system 10 range from one to one hundred; particularly suitable numbers of membrane modules 12 for use in distillation system 10 range from one to twenty five; and even more particularly suitable numbers of membrane modules 12 for use in distillation system 10 range from one to ten.

Feed loop 14 is a fluid pathway for the feed solution, and includes feed source line 18, feed conveyance lines 20a-20d, feed inlet lines 22, feed outline lines 24, discharge line 28, feed reservoir tank 30, and heat exchanger 26. Feed source line 18 is a valve-controlled fluid conduit for transferring the feed solution from a feed solution source (not shown) to feed loop 14. When distillation system 10 reaches a steady state operation, portions of the feed solution are separated within membrane modules 12 to provide the desired distillate fluid in distillate loop 16. As such, feed line 18 desirably provides the feed solution to balance the steady state flow in feed loop 14.

Feed conveyance lines 20a-20d are fluid conduits for feed loop 14, and provide a counter-clockwise flow path in the embodiment shown in FIG. 1. Feed inlet lines 22 are fluid conduits that interconnect feed conveyance line 20d and membrane modules 12, thereby allowing the feed solution to flow into the shell sides of membrane modules 12. Feed outlet lines 24 are fluid conduits that interconnect feed loop line 20a to membrane modules 12. This allows the distilled feed solution to exit the shell sides of membrane modules 12, and reenter feed loop 14.

Discharge line 28 is a valve-controlled fluid conduit interconnecting feed conveyance lines 20a and 20b, which allows a portion of the feed solution to bleed out of feed loop 14. This is beneficial to control the concentration of the residual feed solution during a steady state operation. Feed reservoir tank 30 is a container fed by feed conveyance line 20b, which provides a reservoir of the feed solution during operation. Feed reservoir tank 30 is also connected to feed conveyance line 20c for supplying the feed solution to heat exchanger 26. Heat exchanger 26 is a heat-providing heat exchanger that interconnects feed conveyance lines 20c and 20d. Accordingly, heat exchanger 26 increases the temperature of the feed solution passing from feed conveyance line 20c to feed conveyance line 20d. As discussed below, the increased temperature of the feed solution assists in creating vapor pressure differentials within membrane modules 12, thereby allowing membrane modules 12 to transport the vapor from the feed solution side to the distillate side.

Distillate loop 16 is a fluid pathway for the distillate fluid, and includes heat exchanger 32, distillate conveyance lines 34a-34d, distillate reservoir tank 36, distillate inlet lines 38, distillate outlet lines 40, recovery line 42, and storage tank 44. In addition to the distillate fluid obtained from the separation processes within membrane modules 12, distillate loop 16 also desirably contains a flow of cool distillate fluid to further assist the separation processes. Heat exchanger 32 is a cooling heat exchanger that interconnects distillate conveyance lines 34a and 34b, thereby lowering the temperature of the distillate fluid flowing through distillate conveyance line 34a to distillate conveyance line 34b.

Distillate conveyance lines 34a-34d are fluid conduits for distillate loop 16, and provide a clockwise flow path for the distillate fluid in the embodiment shown in FIG. 1. Distillate reservoir tank 36 is a container fed by distillate conveyance line 34b, which provides a reservoir of the cool distillate solution during operation. Distillate reservoir tank 36 is also connected to distillate conveyance line 34c for supplying the distillate fluid to distillate inlet lines 38, thereby allowing the distillate fluid to flow into membrane modules 12. Distillate outlet lines 40 are fluid conduits that interconnect membrane modules 12 and distillate conveyance line 34d. This allows the distillate fluid to exit membrane modules 12, and reenter distillate loop 16.

Recovery line 42 is a valve-controlled fluid conduit connected to distillate conveyance line 34d for transferring a portion of the distillate fluid from distillate loop 16 to storage tank 44. Storage tank 44 is a container for receiving the distillate fluid obtained from membrane modules 12. As discussed above, when distillation system 10 reaches a steady state operation, a portion of the feed solution is separated at membrane modules 12 to provide the distillate fluid in distillate loop 16. As such, recovery line 42 and storage tank 44 allow the obtained amounts of distillate fluid to be removed from distillate loop 16 and stored as a recovered product (e.g., clean water from a brine solution). This allows distillate loop 16 to substantially maintain a steady state flow.

During a steady state operation, the feed solution flows in a counter-clockwise direction around feed loop 14, and is heated in part by heat exchanger 26 to an elevated temperature. Suitable elevated temperatures may vary depending on the composition of the feed solution. For aqueous feed solutions, examples of suitable elevated temperatures range from about 50° C. to less than 100° C., with particularly suitable elevated temperatures ranging from about 70° C. to about 90° C. While flowing through feed loop 14, a portion of the heated feed solution flows into the shell sides of membrane modules 12 via feed inlet lines 22, and the remaining portion of the heated feed solution continues to flow through feed conveyance line 20d. In an alternative embodiment, feed loop 14 may require all of the heated feed solution to flow into the shell sides of membrane modules 12 via feed inlet lines 22. In this embodiment, heat exchanger 26 only interconnects feed conveyance line 20c and feed inlet lines 22.

Also during the steady state operation, a supply of the distillate fluid flows in a clockwise direction around distillate loop 16, and is cooled in part by heat exchanger 32 to a lowered temperature. Suitable lowered temperatures for the distillate fluid may vary depending on the composition of the distillate fluid. For aqueous distillate fluids, examples of suitable lowered temperatures range from about 5° C. to less than 50° C., with particularly suitable lowered temperatures ranging from about 20° C. to less than 40° C. While flowing through distillate loop 16, the cooled distillate fluid flows into the tube sides of membrane modules 12 via distillate inlet lines 38.

The cool distillate fluid and the heated feed solution flowing into membrane modules 12 create temperature differentials between the shell and tube sides of membrane modules 12. The temperature differentials correspondingly create vapor pressure differentials, higher vapor pressure on the shell side versus lower vapor pressure on the tube side. The membranes inside the modules 12 allow only vapor to be transported across the membrane wall into the bore side of the tube. The distillate fluid may then be collected in recovery tank 44 as the desired distillate product (e.g., clean water in a water treatment process).

While flowing through the shell sides of membrane modules 12, the feed solution also loses thermal energy due to latent and conductive heat transfers. In a standard membrane module, the transferred heat will be carried away from the modules. However, as discussed below, membrane modules 12 also function as heat exchangers to recoup at least a portion of the thermal energy inside the modules. This increases the thermal efficiency of distillation system 10, thereby reducing the amount of energy required and the size of heat exchangers 26 and 32. As a result, distillation system 10 may operate with lower operation costs. Additionally, while membrane modules 12 are shown in FIG. 1 in use with distillation system 10, membrane modules 12 may alternatively be used with a variety of systems for separating a distillate fluid from a feed solution, and for reducing thermal energy requirements in the given systems.

Figure 2:
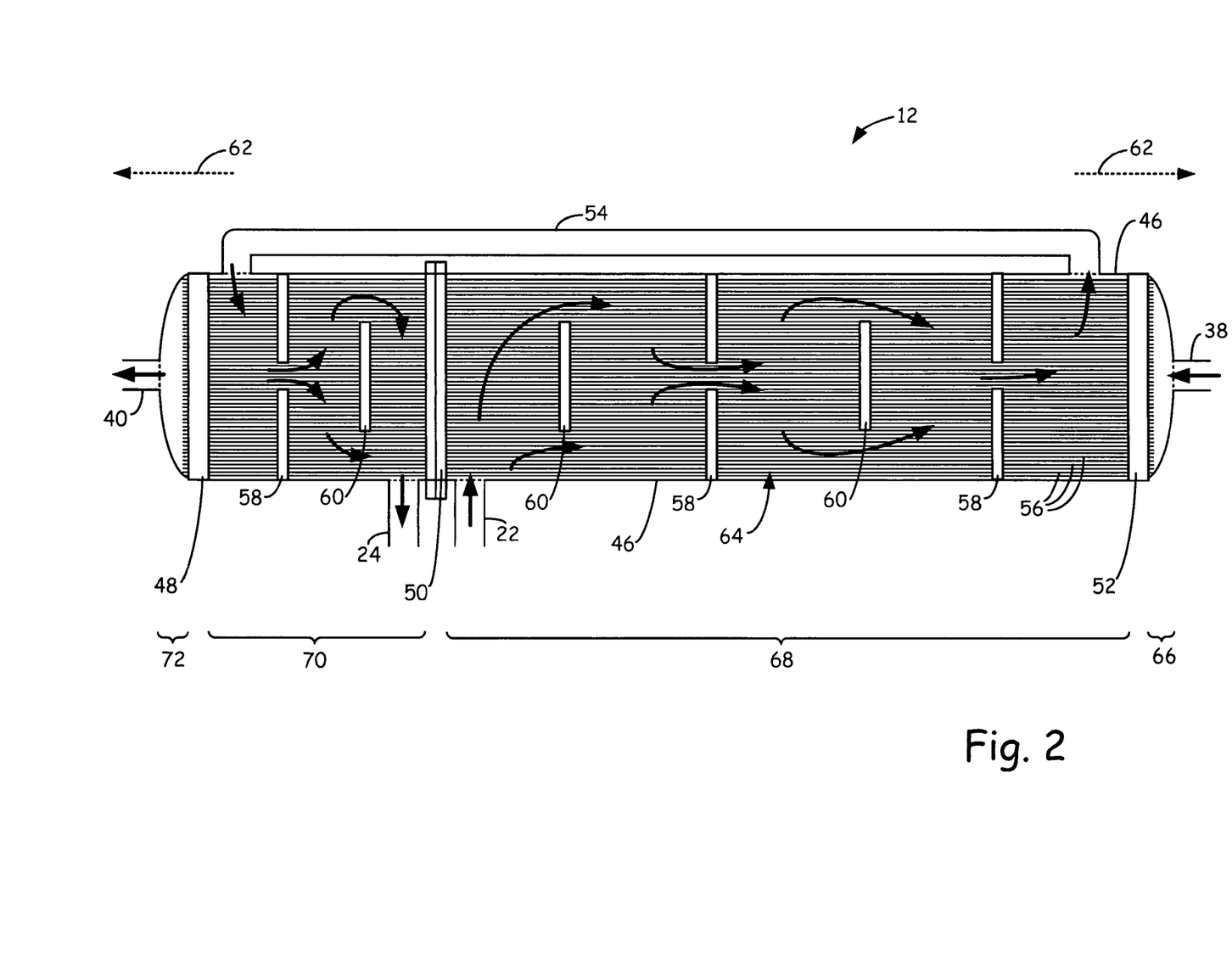
FIG. 2 is a schematic illustration of an interior of one of the hollow fiber membrane modules.

FIG. 2 is a schematic illustration of an interior of membrane module 12, which corresponds to one of the membrane modules 12 shown in FIG. 1. As shown in FIG. 2, membrane module 12 includes outer casing 46, potting resin walls 48, 50, and 52, connection conduit 54, hollow fiber membranes 56, and baffles 58 and 60. Outer casing 46 is a rigid structure extending along a longitudinal axis (referred to as longitudinal axis 62), and defines interior region 64 of membrane module 12. Outer casing 46 also desirably includes couplings (not shown) for connecting membrane module 12 to feed inlet line 22, feed outlet line 24, distillate inlet line 38, and distillate outlet line 40.

Potting resin walls 48, 50, and 52 are seals extending perpendicular to longitudinal axis 62, and are formed from one or more sealant materials, such as acrylate and epoxy-based materials. Accordingly, potting resin walls 48, 50, and 52 divide interior region 64 into distillate inlet chamber 66, contactor chamber 68, recuperator chamber 70, and distillate outlet chamber 72. Distillate inlet chamber 66 is the chamber disposed between outer casing 46 and potting resin wall 52, and is open to distillate inlet line 38. Contactor chamber 68 is the chamber disposed between potting resin walls 50 and 52, within outer casing 46, and is open to feed inlet line 22 and connection conduit 54. Recuperator chamber 70 is the chamber disposed between potting resin walls 48 and 50, within outer casing 46, and is open to feed outlet line 24 and connection conduit 54. Distillate outlet chamber 72 is the chamber disposed between outer casing 46 and potting resin wall 48, and is open to distillate outlet line 40.

As discussed below, contactor chamber 68 is the section of membrane module 12 where separation through distillation occurs, and recuperator chamber 70 is the section of membrane module 12 where a portion of the heat from the hot distillate flowing on one side of hollow fiber membranes 56 is transferred to the cooler feed residual feed solution on the other side of hollow fiber membranes 56. Suitable dimensions for contactor chamber 68 and recuperator chamber 70 may vary depending on the desired heat and mass transfer properties. Examples of suitable lengths along longitudinal axis 62 for each of contactor chamber 68 and recuperator chamber 70 range from about 13 centimeters (about 5 inches) to about 76 centimeters (about 30 inches), with particularly suitable lengths ranging from about 25 centimeters (about 10 inches) to about 51 centimeters (about 20 inches), and with even more particularly suitable lengths ranging from about 30 centimeters (about 12 inches) to about 41 centimeters (about 16 inches). Examples of suitable diameters orthogonal to longitudinal axis 62 for each of contactor chamber 68 and recuperator chamber 70 range from about 3 centimeters (about 1 inch) to about 41 centimeters (about 16 inches), with particularly suitable diameters ranging from about 5 centimeters (about 2 inches) to about 30 centimeters (about 12 inches), and with even more particularly suitable diameters ranging from about 8 centimeters (about 3 inches) to about 13 centimeters (about 5 inches).

Connection conduit 54 is a shell-side conduit that allows the feed solution to travel from contactor chamber 68 to recuperator chamber 70 during operation. Hollow fiber membranes 56 are a plurality of tubular membranes that extend along longitudinal axis 62 between distillate inlet chamber 66 and distillate outlet chamber 72. Hollow fiber membranes 56 are desirably bundled together within the volume of interior region 64 to increase the total membrane surface area. In one embodiment, hollow fiber membranes 56 substantially fill the open volumes of contactor chamber 68 and recuperator chamber 70. This allows the feed solution to travel through contactor chamber 68 and recuperator chamber 70 in the interstitial voids between the membranes. Alternatively, one or more portions of contactor chamber 68 and recuperator chamber 70 may be unoccupied by hollow fiber membranes 56, thereby providing larger flow paths for the feed solution.

Hollow fiber membranes 56 each include an inner hollow region (not shown in FIG. 2) that extends through potting resin walls 48, 50, and 52 and baffles 58 and 60 along longitudinal axis 62. This provides a tube-side flow path for the distillate fluid between distillate inlet chamber 66 and distillate outlet chamber 72 (i.e., the distillate fluid may flow through the inner hollow regions of hollow fiber membranes 56). Conversely, the shell-side flow path of the feed solution extends between the exterior surfaces of hollow fiber membranes 56, within contactor chamber 68 and recuperator chamber 70, and through connection conduit 54.

The segments of hollow fiber membranes 56 at contactor chamber 68 are formed from one or more hydrophobic, microporous materials that are capable of separating the distillate fluid from the feed solution via vapor pressure differentials. In contrast, the segments of hollow fiber membranes 56 at recuperator chamber 70 are non-porous, thereby preventing mass transfer across the membranes, but allow conductive heat transfer to occur. As such, recuperator chamber 70 functions as a heat exchanger for increasing the thermal efficiency of membrane module 12 and distillation system 10 (shown in FIG. 1).

Baffles 58 and 60 are shell-side flow barriers (e.g., acrylate and epoxy-based barriers) within contactor chamber 68 and recuperator chamber 70 that direct the flow of the feed solution in cross patterns relative to hollow fiber membranes 56. As shown, baffles 58 have axially-centric openings, thereby directing the flow paths of the feed solution toward the axial centers of contactor chamber 68 and recuperator chamber 70. Baffles 60, however, have openings that are non-axially centric (e.g., adjacent outer casing 46), which directs the flow paths of the feed solution away from the axial centers of contactor chamber 68 and recuperator chamber 70. Accordingly, the alternating arrangement of baffles 58 and 60 force the feed solution to flow across hollow fiber membranes 56 in a quasi-cross flow geometry and the feed solution passes axially down chamber 68, thereby increasing the mass and heat transfers across hollow fiber membranes 56. Suitable numbers of baffles 58 and 60 may vary depending on the dimensions of contactor chamber 68 and recuperator chamber 70, and on the desired flow paths of the feed solution. Examples of suitable numbers of baffles (e.g., baffles 58 and 60) for each of contactor chamber 68 and recuperator chamber 70 range from one baffle to ten baffles, with particularly suitable numbers of baffles ranging from one baffle to five baffles.

During operation, the heated feed solution enters contactor chamber 68 via feed inlet line 22. The feed solution is then directed around the openings of baffles 58 and 60 toward potting resin wall 52, where baffles 58 and 60 cause the feed solution to move in a cross flow pattern relative to hollow fiber membranes 56. While the feed solution flows through contactor chamber 68, the cool distillate fluid enters distillate inlet chamber 66 via distillate inlet line 38, and flows through the inner hollow regions of hollow fiber membranes 56 toward distillate outlet chamber 72. As the heated feed solution flows around the exterior surfaces of hollow fiber membranes 56, the temperature differentials between the exterior surfaces and the inner hollow regions of hollow fiber membranes 56 create vapor pressure differentials across hollow fiber membranes 56 within contactor chamber 68. This causes a portion of the distillate fluid in the feed solution to evaporate and transmit through the micropores of hollow fiber membranes 56. When the vapor passes into the inner hollow regions of hollow fiber membranes 56, the cool supply of distillate fluid causes the vapor to condense within the inner hollow regions and mix with the supply of distillate fluid. The distillate fluid then flows toward distillate outlet chamber 72, and into distillate outlet line 40.

As discussed above, while the distillate fluid separates from the feed solution, latent and conductive heat also transfers from the feed solution to the distillate fluid flowing through the inner hollow regions of hollow fiber membranes 56. While flowing through contactor chamber 68, the feed solution gradually cools down due to the heat transfer across hollow fiber membranes 56. Thus, within contactor chamber 68, the feed solution bulk temperature drops to the lowest value just before entering connection conduit 54 and recuperator chamber 70. In contrast, while flowing through the inner hollow regions of hollow fiber membranes 56 within contactor chamber 68, the distillate fluid gradually heats up due the heat transfer across hollow fiber membranes 56. This heat transfer within contactor chamber 68 increases the temperature of the distillate fluid and decreases the temperature of the feed solution such that the bulk temperature of the distillate fluid entering recuperator chamber 70 on the tube side of membrane module 12 is greater than the bulk temperature of the residual feed solution entering recuperator chamber 70 on the shell side of membrane module 12.

Upon entering recuperator chamber 70 from connection conduit 54, the residual feed solution flows through recuperator chamber 70 toward feed outlet line 24. Baffles 58 and 60 accordingly cause the distilled feed solution to flow in a quasi-cross flow path relative to hollow fiber membranes 56. As discussed above, however, the segments of hollow fiber membranes 56 within recuperator chamber 70 are non-porous. Thus, distillate fluid vapor does not penetrate across hollow fiber membranes 56 within recuperator chamber 70. Nonetheless, conductive heat is capable of traveling across the segments of hollow fiber membranes 56 within recuperator chamber 70. As a result, at least a portion the thermal energy acquired during the separation process within contactor chamber 68 is transferred from the distillate fluid (i.e., from the tube side of membrane module 12) back to the feed solution (i.e., to the shell side of membrane module 12).

During the steady state operation, heat exchanger 26 (shown in FIG. 1) desirably maintains the feed solution within feed loop 14 (shown in FIG. 1) at the elevated temperature despite heat losses within membrane module 12. Similarly, heat exchanger 32 (shown in FIG. 1) desirably maintains the distillate fluid within distillate loop 16 (shown in FIG. 1) at the lowered temperature despite heat acquired within membrane module 12. Thus, the heat recovery within recuperator chamber 70 reduces the amount of energy required by heat exchanger 26 to heat the feed solution flowing through feed loop 14, and by heat exchanger 32 to cool the distillate fluid flowing through distillate loop 16. This increases the thermal efficiency of distillation system 10 (shown in FIG. 1), thereby reducing operation costs required to produce the distillate fluid.

Figure 3:
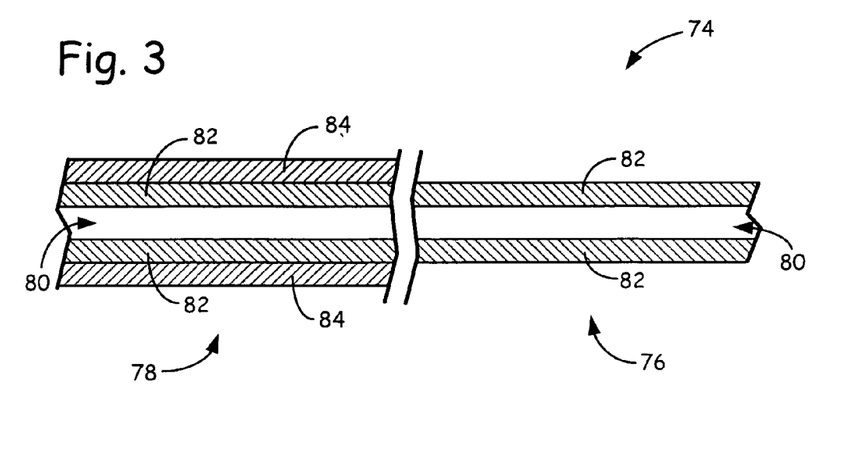
FIG. 3 is an expanded sectional view of an exemplary hollow fiber membrane in the hollow fiber membrane module.

FIG. 3 is an expanded sectional view of membrane 74, which is an example of a single membrane of hollow fiber membranes 56 (shown in FIG. 2). As shown in FIG. 3, membrane 74 includes segments 76 and 78, and inner hollow region 80, where segment 76 is the portion of membrane 74 within contactor chamber 68 (shown in FIG. 2), and segment 78 is the portion of membrane 74 within recuperator chamber 70 (shown in FIG. 2). Segments 76 and 78 each include membrane wall 82, which is formed from one or more hydrophobic materials and includes a plurality of micropores (not shown) that allow the transmission of gases and vapors, but restricts the flow of liquids and solids. This allows the distillate fluid to separate from the feed solution via vapor pressure differentials.

Examples of suitable wall thicknesses for membrane wall 82 range from about 50 micrometers to about 200 micrometers, with particularly suitable wall thicknesses ranging from about 100 micrometers to about 150 micrometers. Examples of suitable average micropore sizes for membrane wall 82 range from about 0.1 micrometers to about 1.0 micrometers, with particularly average suitable micropore sizes ranging from about 0.3 micrometers to about 0.7 micrometers. Examples of suitable materials for membrane wall 82 include polymeric materials, such as polypropylenes, polyethylenes, polysulfones, polyethersulfones, polyetheretherketones, polyimides, polyphenylene sulfides, polytetrafluoroethylenes, polyvinylidene difluorides, and combinations thereof.

As further shown, segment 78 also includes coating 84, which desirably covers the entire exterior surface of membrane wall 82 at segment 78. Coating 84 is a non-porous coating that blocks the transmission of gases and vapors, thereby preventing mass transfer across membrane 74 within recuperator chamber 70. Suitable materials for coating 84 include any hydrophobic polymeric material that are stable to the heat and aqueous solutions. Examples of suitable materials for coating 84 include the suitable polymeric materials discussed above for membrane wall 82, except that coating 84 does not include micropores. Coating 84 may be formed on membrane wall 82 with a variety of coating techniques, such as dip coating, wash coating, and spray coating. In alternative embodiments, the micropores of membrane wall 82 at segment 78 may be filled to block the transmission of gases and vapors, or membrane wall 82 at segment 78 may be formed without micropores. In these embodiments, membrane wall 82 is capable of blocking the transmission of gases and vapors, and coating 84 may be omitted.

As discussed above, while within contactor chamber 68, the cool distillate fluid flows through inner hollow region 80 of membrane 74 and the heated feed solution flows adjacent to the exterior surface of membrane wall 82. This creates a vapor pressure differential across membrane wall 82, allowing distillate fluid vapor to penetrate through the micropores of membrane wall 82 into inner hollow region 80. Correspondingly, the distillate fluid vapor carries latent heat from the feed solution to the distillate fluid within inner hollow region 80. Additionally, thermal energy also conductively transfers across membrane wall 82 from the feed solution to the distillate fluid within inner hollow region 80.

Within recuperator chamber 70, coating 84 substantially prevents mass transfer across segment 78 of membrane 74. Thus, distillate fluid vapor does not penetrate across segment 78. However, segment 78 allows thermal energy to conductively transfer across membrane wall 82 and coating 84, thereby recovering heat from the distillate fluid flowing through inner hollow region 76 to the feed solution flowing adjacent coating 84. This increases the thermal efficiency of membrane module 12 (shown in FIG. 2).

Figure 4:
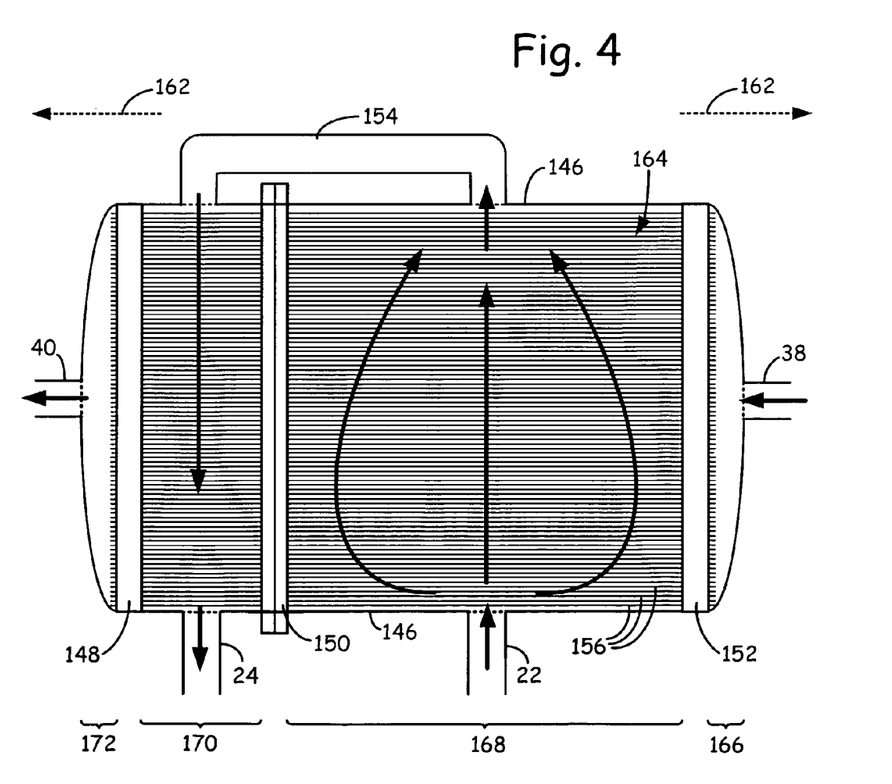
FIG. 4 is a schematic illustration of an interior of an alternative hollow fiber membrane module.

FIG. 4 is a schematic illustration of an interior of membrane module 112, which is an alternative to membrane module 12 (shown in FIG. 2), where the reference numerals of the corresponding components are increased by 100. As shown in FIG. 4, membrane module 112 includes outer casing 146, potting resin walls 148, 150, and 152, connection conduit 154, and hollow fiber membranes 156, which function in the same manner as the corresponding components of membrane module 12. Accordingly, outer casing 146 is a rigid structure extending along longitudinal axis 162, and defines interior region 164 of membrane module 112. Outer casing 146 also desirably includes couplings (not shown) for connecting membrane module 112 to feed inlet line 22, feed outlet line 24, distillate inlet line 38, and distillate outlet line 40 of distillation system 10 (shown in FIG. 1). While shown with a tubular geometry, outer casing 146 may exhibit alternative geometries, such as rectangular geometries.

Potting resin walls 148, 150, and 152 are seals that divide interior region 164 into distillate inlet chamber 166, contactor chamber 168, recuperator chamber 170, and distillate outlet chamber 172, where the length-to-width ratio of interior region 164 differs from that of interior region 64 (shown in FIG. 2). Accordingly, in the embodiment shown in FIG. 4, the flow paths of the feed solution through contactor chamber 168 and recuperator chamber 170 are perpendicular to lengths of hollow fiber membranes 156. This creates a cross flow relative to hollow fiber membranes 156 to increase the mass and heat transfers across hollow fiber membranes 156. Thus, in this embodiment, baffles corresponding to baffles 58 and 60 (shown in FIG. 2) are omitted.

Connection conduit 154 is a shell-side conduit that allows the feed solution to travel from contactor chamber 168 to recuperator chamber 170 during operation. Hollow fiber membranes 156 are a plurality of tubular membranes that extend along longitudinal axis 162 between distillate inlet chamber 166 and distillate outlet chamber 172, and function in the same manner as hollow fiber membranes 56 (shown in FIG. 2). Accordingly, the segments of hollow fiber membranes 156 at contactor chamber 168 are formed from one or more hydrophobic, microporous materials that are capable of separating the distillate fluid from the feed solution. In contrast, the segments of hollow fiber membranes 156 at recuperator chamber 170 are non-porous, thereby preventing mass transfer across the membranes, but allow conductive heat transfer to occur. As such, recuperator chamber 170 functions as a heat exchanger in the same manner as recuperator chamber 70 (shown in FIG. 2) for increasing the thermal efficiency of membrane module 112 and distillation system 10.

During operation, the heated feed solution enters contactor chamber 168 via feed inlet line 22. While the feed solution flows through contactor chamber 168 toward connection conduit 154, the cool distillate fluid enters distillate inlet chamber 166 via distillate inlet line 38, and flows through the inner hollow regions of hollow fiber membranes 156 toward distillate outlet chamber 172. The vapor pressure differentials that are created across hollow fiber membranes 156 within contactor chamber 168 cause a portion of the distillate fluid in the feed solution to evaporate and transmit through the micropores of hollow fiber membranes 156. As discussed above, latent and conductive heat also transfers from the feed solution to the distillate fluid flowing through the inner hollow regions of hollow fiber membranes 156.

Upon entering recuperator chamber 170 from connection conduit 154, the distilled feed solution flows through recuperator chamber 170 toward feed outlet line 24. As discussed above, the segments of hollow fiber membranes 56 within recuperator chamber 170 are non-porous. Thus, distillate fluid vapor does not penetrate across hollow fiber membranes 156 within recuperator chamber 170. Nonetheless, conductive heat is capable of traveling across the segments of hollow fiber membranes 156 within recuperator chamber 170. As a result, at least a portion the thermal energy acquired during the separation process within contactor chamber 168 is transferred from the distillate fluid back to the distilled feed solution. This heat recovery within recuperator chamber 170 reduces the amount of energy required by heat exchangers 26 and 32 (shown in FIG. 1), thereby increasing the thermal efficiency of distillation system 10.

Although the present invention has been described with reference to preferred embodiments, workers skilled in the art will recognize that changes may be made in form and detail without departing from the spirit and scope of the invention.

The invention claimed is:

1. A membrane module comprising:
    an outer casing having an interior region;
    a seal disposed within the outer case, thereby dividing a portion of the interior region into a first chamber and a second chamber;
    an inlet opening extending through the outer casing at the first chamber;
    an outlet opening extending through the outer casing at the second chamber;
    a conduit interconnecting the first chamber and the second chamber to permit flow of a feed solution from the first chamber to the second chamber; and
    a plurality of hollow fiber membranes extending through the first chamber and the second chamber, and having inner hollow regions configured to provide flow paths for a distillate fluid, wherein at least a portion of the plurality of hollow fiber membranes have first segments located within the first chamber and second segments located within the second chamber, the first segments being configured to allow vapor transmission from the first chamber into the inner hollow regions, and the second segments being configured to substantially prevent vapor transmission between the second chamber and the inner hollow regions, and further configured to allow transmission of thermal energy therethrough.

2. The membrane module of claim 1, wherein the first segments and the second segments of at least one of the plurality of hollow fiber membranes comprise a microporous membrane wall, and wherein the second segment further comprises a polymeric coating disposed on the microporous membrane wall to block transmission of gas and vapor.

3. The membrane module of claim 1, wherein the microporous membrane wall is formed from at least one polymeric material selected from the group consisting of polypropylenes, polyethylenes, polysulfones, polyethersulfones, polyetheretherketones, polyimides, polyphenylene sulfides, polytetrafluoroethylenes, polyvinylidene difluorides, and combinations thereof.

4. The membrane module of claim 1, wherein the inlet opening is configured to receive a feed solution from a feed solution loop and the outlet opening is configured to output a distilled feed solution to the feed solution loop.

5. The membrane module of claim 1, further comprising:
    a third chamber disposed adjacent to the first chamber, the third chamber being in fluid communication with the plurality of hollow fiber membranes; and
    a fourth chamber disposed adjacent to the second chamber, the fourth chamber also being in fluid communication with the plurality of hollow fiber membranes.

6. The membrane module of claim 1, further comprising at least one baffle disposed in at least one of the first chamber and the second chamber.

7. The membrane module of claim 6, further comprising a plurality of baffles disposed in at least one of the first chamber and the second chamber.

8. The membrane module of claim 1, wherein at least one of the first chamber and the second chamber has a length ranging from about 13 centimeters to about 76 centimeters, and a diameter ranging from about 3 centimeters to about 41 centimeters.

9. A membrane module comprising:
    a housing;
    a first chamber disposed within the housing, and having a feed solution inlet;

a second chamber disposed within the housing, and having an outlet for the feed solution;
- a conduit interconnecting the first chamber and the second chamber, wherein the first chamber, the second chamber, and the conduit are configured to provide flow paths for a feed solution flowing from the first chamber to the second chamber via the conduit; and
- a plurality of hollow fiber membranes extending through the first chamber and the second chamber to a distillate outlet, and having inner hollow regions configured to provide flow paths for a distillate fluid, the plurality of hollow fiber membranes having first segments located within the first chamber and second segments located within the second chamber, wherein the first segments are configured to allow transmission of distillate fluid vapor therethrough and the second segments are configured to prevent transmission of distillate fluid vapor therethrough while allowing transmission of thermal energy therethrough.

10. The membrane module of claim 9, wherein the first segments and the second segments of at least one of the plurality of hollow fiber membranes comprise a microporous membrane wall, and wherein the second segment further comprises a polymeric coating disposed on the microporous membrane wall to block transmission of gas and vapor.

11. The membrane module of claim 9, further comprising a plurality of baffles disposed in at least one of the first chamber and the second chamber, the plurality of baffles being configured to at least partially direct the flow paths of the feed solution.

12. The membrane module of claim 11, wherein at least a first of the plurality of baffles has an axially-centric opening, and wherein at least a second of the plurality of baffles has a non-axially centric opening.

13. The membrane module of claim 9, further comprising at least one seal separating the first chamber from the second chamber.

14. A system for separating a distillate fluid from a feed solution, the system comprising:
- a feed loop for providing a supply of the feed solution;
- a distillate loop for providing a supply of the distillate fluid;
- at least one membrane module comprising:
  - a housing;
  - a first chamber disposed within the housing;
  - a second chamber disposed within the housing;
  - a conduit for permitting flow of the feed solution from the first chamber to the second chamber; and
  - a plurality of hollow fiber membranes extending through the first chamber and the second chamber, the plurality of hollow fiber membranes separating the at least one membrane module into a shell side and a tube side, wherein the shell side is in fluid communication with the feed loop and the tube side is in fluid communication with the distillate loop, and wherein at least one of the plurality of hollow fiber membranes comprises:
    - a first segment located within the first chamber and being configured to allow transmission of distillate fluid vapor from the shell side to the tube side; and
    - a second segment located within the second chamber and configured to substantially prevent transmission of distillate fluid vapor from the shell side to the tube side, and further configured to allow transmission of thermal energy between the tube side and the shell side.

15. The system of claim 14, wherein the feed loop comprises a heat exchanger configured to heat the feed solution to a temperature ranging from about 50° C. to less than 100° C.

16. The system of claim 14, wherein the distillate loop comprises a heat exchanger configured to cool the distillate fluid to a temperature ranging from about 5° C. to about 50° C.

17. The system of claim 14, wherein the first segment and the second segment comprise a microporous membrane wall, and wherein the second segment further comprises a polymeric coating disposed on the microporous membrane wall to block transmission of gas and vapor.

18. The system of claim 17, wherein the microporous membrane wall is formed from at least one polymeric material selected from the group consisting of polypropylenes, polyethylenes, polysulfones, polyethersulfones, polyetheretherketones, polyimides, polyphenylene sulfides, polytetrafluoroethylenes, polyvinylidene difluorides, and combinations thereof.

19. The system of claim 14, wherein the membrane module further comprises at least one baffle disposed in at least one of the first chamber and the second chamber.

20. The system of claim 14, wherein at least one of the first chamber and the second chamber has a length ranging from about 13 centimeters to about 76 centimeters, and a diameter ranging from about 3 centimeters to about 41 centimeters.

* * * * *